United States Patent
Rannoux et al.

(10) Patent No.: US 9,926,468 B2
(45) Date of Patent: Mar. 27, 2018

(54) PROCESS OF ASSEMBLING AND REPOSITIONING TWO PARTS

(71) Applicant: The Swatch Group Research and Development Ltd, Marin (CH)

(72) Inventors: Claire Rannoux, Lausanne (FR); Maria Fernandez Ciurleo, Fleurier (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/370,351

(22) Filed: Dec. 6, 2016

(65) Prior Publication Data

US 2017/0174942 A1 Jun. 22, 2017

(30) Foreign Application Priority Data

Dec. 18, 2015 (EP) ..................... 15201237

(51) Int. Cl.
| | |
|---|---|
| C09J 5/06 | (2006.01) |
| B29C 35/02 | (2006.01) |
| B29C 35/16 | (2006.01) |
| B29C 65/48 | (2006.01) |
| C08G 81/02 | (2006.01) |
| C09J 5/04 | (2006.01) |
| C09J 153/00 | (2006.01) |
| C09J 201/02 | (2006.01) |
| C08F 297/06 | (2006.01) |
| B29K 105/00 | (2006.01) |

(52) U.S. Cl.
CPC ................. C09J 5/06 (2013.01); B29C 35/02 (2013.01); B29C 35/16 (2013.01); B29C 65/4815 (2013.01); C08F 297/06 (2013.01); C08G 81/021 (2013.01); C09J 5/04 (2013.01); C09J 153/00 (2013.01); C09J 201/02 (2013.01); B29K 2105/0085 (2013.01); C09J 2201/622 (2013.01); C09J 2205/302 (2013.01); C09J 2453/00 (2013.01)

(58) Field of Classification Search
CPC .................................. C09J 5/06; B29C 35/02
See application file for complete search history.

(56) References Cited

U.S. PATENT DOCUMENTS

| | | | |
|---|---|---|---|
| 2003/0116272 A1* | 6/2003 | Aubert | C08G 73/12 156/327 |
| 2012/0309895 A1* | 12/2012 | Schmidt | C09J 4/00 524/599 |
| 2012/0325402 A1 | 12/2012 | Suwa et al. | |

FOREIGN PATENT DOCUMENTS

WO WO 2011/112447 A2 9/2011

OTHER PUBLICATIONS

European Search Report dated Jun. 3, 2016 in European Application 15201237, filed on Dec. 18, 2015 ( with English translation of Categories of Cited Documents).
Markus J. Barthel et al. "Self-Healing Materials via Reversible Crosslinking of Poly(ethylene oxide)-Block-Poly(furfuryl glycidyl ether) (PEO-b-PFGE) Block Copolymer Films", Advanced Functional Materials, vol. 23, No. 39, 2013, 12 pages.
Jing Bai et al. "Dynamic crosslinked poly(styrene-block-butadiene-block-styrene) via Diels-Alder Chemistry: an ideal method to improve solvent resistance and mechanical properties without losing its thermal plastic behavior", Royal Society of Chemistry, vol. 5, No. 56, 2015, 13 pages.

\* cited by examiner

*Primary Examiner* — Daniel H Lee
(74) *Attorney, Agent, or Firm* — Oblon, McClelland, Maier & Neustadt, L.L.P.

(57) ABSTRACT

The invention relates to a process for assembling and repositioning at least two parts by means of a repositionable hot melt adhesive, wherein said parts are held together in assembled position when said adhesive is at a temperature $T_A$ and can be repositioned in relation to one another when said adhesive is heated to a temperature $T_C$, wherein said adhesive comprises at least a formulation, which:

at the temperature $T_C$ has the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$, at a temperature $T_A$ has the form of a three-dimensional network, in which the polymer chains are linked to one another by the coupling molecules by means of the Diels-Alder reaction, where $T_A < T_{RDA} \leq T_C$, where $T_{DA}$ ranges between 0° C. and 100° C. and $T_{RDA}$ ranges between 50° C. and 200° C., and $T_{DA}$ is strictly lower than $T_{RDA}$.

The polymer chain is a block copolymer comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than $T_{DA}$.

19 Claims, No Drawings

PROCESS OF ASSEMBLING AND REPOSITIONING TWO PARTS

This application claims priority from European Patent application 15201237.3 of Dec. 18, 2015, the entire disclosure of which is hereby incorporated herein by reference.

FIELD OF THE INVENTION

The present invention relates to a process for assembling and repositioning two parts by means of a repositionable hot melt adhesive arranged to assemble said parts together and to allow the parts to be repositioned when said adhesive is heated.

BACKGROUND OF THE INVENTION

In the field of clock-making timepiece parts are assembled together by means of a glue or an adhesive. The gluing points must be formed by means of a repositionable hot melt adhesive to enable them to be reworked using heat in a manual operation and to allow the glued parts to be repositioned in an optimum manner either during assembly or during maintenance or repair of the parts as part of aftersales service. Moreover, this adhesive must also have resistance to chemical cleaning operations, in particular to withstand timepiece cleaning operations conducted during the aftersales service.

As an example, the ruby pallet stones are secured to the pallets by gluing, generally by means of a shellac. Shellac is a natural resin that is thermofusible, i.e. it has a honey-like consistency at temperatures higher than its melting temperature (Tf) and is solid below its melting temperature (Tf) or its glass transition temperature (Tg). Thus, shellac can be softened by an operator using heat so that the pallet-stones can be displaced a few microns on the pallets. However, like any hot melt compound, shellac is soluble in solvents. Parts assembled using shellac therefore have a poor resistance to timepiece cleaning operations.

Another example relates to the balance spring glued to its stud by means of thermosetting glues such as the resin Epikote™. Thermosetting glues have a good chemical resistance. However, they cannot be reworked using heat, and therefore parts assembled using thermosetting glues cannot be separated and repositioned if required.

SUMMARY OF THE INVENTION

The object of the invention in particular is to remedy the different disadvantages of the known glues used hitherto to assemble parts, in particular timepiece parts.

More precisely, an object of the invention is to provide a process using an adhesive that allows formation of an assembly of parts that can be reworked using heat to allow said parts to be repositioned while still being suitably resistant to chemical cleaning operations.

For this purpose, the present invention relates to a process for assembling and repositioning at least two parts by means of a repositionable adhesive arranged to assemble said parts when said adhesive is at a temperature $T_A$ and to allow said parts to be repositioned in relation to one another when said adhesive is heated to a temperature $T_C$, wherein said adhesive comprises at least one formulation, which:

at the temperature $T_C$ has the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$, at a temperature $T_A$ has the form of a three-dimensional network, in which the polymer chains are linked to one another by the coupling molecules by means of the Diels-Alder reaction, where $T_A < T_{RDA} \leq T_C$ where temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$.

According to the invention the polymer chain is a block copolymer comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than $T_{DA}$.

Advantageously, said assembly and repositioning process comprises the steps of:

a) preparing a solution of an adhesive comprising at least one formulation having the form of a mixture of block copolymer chains comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than $T_{DA}$, and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$, where $T_A < T_{RDA} \leq T_C$, wherein temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$, and temperature $T_C$ is higher than the glass transition temperature Tg or the melting temperature Tf of the first polymer block, b) applying the solution of said adhesive to the parts c) drying d) placing the parts at a temperature higher than or equal to the glass transition temperature Tg or the melting temperature Tf of the first polymer block to reposition the parts e) cooling to a temperature lower than or equal to the glass transition temperature Tg or the melting temperature Tf of the first polymer block, f) placing the parts at a temperature higher than or equal to temperature $T_{DA}$ and lower than $T_{RDA}$ to link the block copolymer chains to one another by means of the coupling molecules by means of the Diels-Alder reaction so that the adhesive is in the form of a three-dimensional network g) heating said parts to temperature $T_C$ to regenerate the mixture of block copolymer chains and of coupling molecules by means of the retro-Diels-Alder reaction h) repositioning the parts i) duplicating steps e) to f)

j) if necessary, repeating steps g) to i) as many times as required to reposition the parts again.

This block structure, in which the blocks each have their own glass transition temperature or melting temperature, advantageously enables the adhesive to have two properties: quick repositioning/immobilisation and resistance to chemical cleaning operations.

The assembly obtained can then be hot worked to separate the parts and reposition them and is resistant to chemical cleaning operations.

DETAILED DESCRIPTION OF THE INVENTION

The process according to the present invention uses a repositionable adhesive arranged to assemble at least two parts when said adhesive is at a temperature $T_A$ and to enable said parts to be repositioned in relation to one another when said adhesive is heated to a temperature $T_C$.

The parts to be assembled are, for example, timepiece parts, i.e. any element used in a timepiece mechanism that needs to be assembled on another element by gluing and that must be separable during an aftersales service, for example, to be repositioned in an optimum manner. An assembly of timepiece parts is, for example, a ruby pallet-stone/pallet assembly or balance spring/stud assembly or index/dial assembly.

The adhesive comprises at least one formulation which:
at the temperature $T_C$ has the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$,
at a temperature $T_A$ has the form of a three-dimensional network, in which the polymer chains are linked to one another by the coupling molecules by means of the Diels-Alder reaction,
where $T_A < T_{RDA} \leq T_C$
where temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$.

Temperatures $T_{DA}$ of the Diels-Alder reaction and $T_{RDA}$ of the retro-Diels-Alder reaction are dependent on the X units of the polymer chain and on the coupling molecule. The latter are selected such that temperature $T_{DA}$ of the Diels-Alder reaction advantageously ranges between 0° C. and 100° C., and more preferred between 25° C. and 70° C., and temperature $T_{RDA}$ of the retro-Diels-Alder reaction ranges between 50° C. and 200° C., preferably between 80° C. and 150° C.

The polymer chain is preferably a block copolymer comprising at least a first polymer block having a glass transition temperature Tg or a melting temperature Tf ranging between 40° C. and 200° C., preferably between 60° C. and 150° C., and at least a second polymer block comprising at least pendant diene units X and having a glass transition temperature Tg or a melting temperature Tf lower than $T_{DA}$, and preferably ranging between −50° C. and 60° C., and more preferred between −50° C. and 20° C.

According to a preferred embodiment of the invention the polymer chain is a block copolymer comprising at each of its ends a polymer block having a glass transition temperature Tg or a melting temperature Tf ranging between 40° C. and 200° C., preferably between 60° C. and 150° C., and a central polymer block comprising at least pendant diene units X and having a glass transition temperature Tg or a melting temperature Tf lower than $T_{DA}$, and preferably ranging between −50° C. and 60° C., and more preferred between −50° C. and 20° C.

Thus, according to the invention the polymer chain comprises at least one "hard" polymer block formed by the polymer block having a glass transition temperature Tg or a melting temperature Tf ranging between 40° C. and 200° C., preferably between 60° C. and 150° C., and a "soft" polymer block formed by the polymer block comprising at least pendant diene units X and having a glass transition temperature Tg or a melting temperature Tf lower than $T_{DA}$, and preferably ranging between −50° C. and 60° C., and more preferred between −50° C. and 20° C.

This soft block/hard block structure, in which the blocks each have their own glass transition temperature or melting temperature, advantageously enables the adhesive to have two properties: quick repositioning/immobilisation and resistance to chemical cleaning operations.

In fact, the hard block (with higher Tg or Tf) ensures that the adhesive solidifies at ambient temperature 25° C.) and assures a fine and quick repositioning of the parts at a temperature higher than the glass transition temperature Tg or the melting temperature Tf of the hard block. The hard block plays the same role as a hot melt adhesive.

The soft blocks (with lower Tg or Tf) coupled by the coupling molecules enable a thermoreversible three-dimensional network to be created between the block copolymers and thus ensure resistance to chemical cleaning operations such as timepiece cleaning operations. As will be described below, the three-dimensional network is formed by placing for some hours the parts that have been repositioned and immobilised by the hard block at a temperature necessary for conducting the Diels-Alder reaction between the soft blocks and the coupling molecules. The low Tg or Tf of this soft block that is lower than $T_{DA}$ allows a high mobility of the chains and thus assures the coupling by means of the Diels-Alder reaction.

Advantageously, the "hard" polymer block with a glass transition temperature Tg or a melting temperature Tf ranging between 40° C. and 200° C., preferably between 60° C. and 150° C., is a homopolymer or copolymer formed from acrylic, methacrylic, acrylamide, styrene methacrylamide or vinyl monomers. Examples of monomers that are particularly suitable to obtain a block with a glass transition temperature or a melting temperature Tf ranging between 60° C. and 150° C. are tert-butyl methacrylate, isobutyl methacrylate, ethyl methacrylate, isobornyl acrylate, isobornyl methacrylate, phenyl methacrylate, N-isopropylacrylamide, isopropyl methacrylate, methacrylic acid, methacrylic anhydride, methacrylonitrile, methyl acrylate, methyl methacrylate, phenyl methacrylate, styrene, 3-methylstyrene, 4-methylstyrene, vinyl alcohol, vinyl benzoate, vinyl cyclohexanoate.

In the "soft" polymer block the pendant diene units X are preferably pendant units comprising at least one, preferably terminal, diene function X, and are selected from the group consisting of furan, cyclopentadiene and anthracene.

Thus, examples of monomers that are particularly suitable for forming a "soft" polymer block comprising pendant diene units X are:

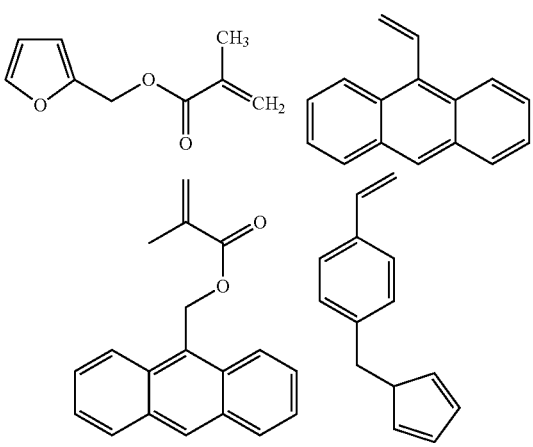

These molecules are commercially available or can be synthesised in one step (synthesis described in the publication Organic Letters, 4(14), 2365-2368; 2002), for example.

The "soft" polymer block can advantageously be a copolymer obtained from different monomers that allow the desired properties to be obtained.

Thus, the "soft" polymer block can comprise pendant units arranged to have an appropriate affinity with the parts to be assembled. These pendant units are also stable at the temperature cycles that the parts to be assembled would be subjected to.

The pendant units arranged to have an appropriate affinity with the parts to be assembled are preferably selected from the group consisting of thiols, thioethers, thioesters, sulphides, thioamides, hydroxyls, catechol, amines, ammoniums, nitrogenated heterocycles such as imidazole or pyridine, carboxylic acids, esters and anhydrides.

Thus, particularly suitable examples of monomers for introducing pendant units arranged to have an appropriate affinity with the parts to be assembled into the "soft" polymer block already comprising pendant units X are:

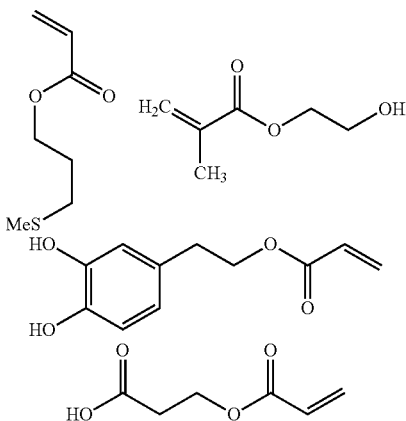

These molecules are commercially available.

Moreover, the "soft" polymer block can advantageously comprise pendant units arranged to adjust the glass transition temperature Tg or melting temperature Tf of said "soft" polymer block to below the $T_{DA}$.

The pendant units arranged to adjust the glass transition temperature Tg or melting temperature Tf of said "soft" polymer block are preferably selected from the group consisting of the possibly functionalised alkyl chains and phenyl derivatives. Thus, examples of suitable commercially available monomers for forming the pendant units arranged to adjust the Tg or Tf of the polymer are methacrylic or acrylic esters, styrene derivatives. The following may be given as example: butyl methacrylate (homo-butyl methacrylate=20° C.), cyclohexyl acrylate (homo-cyclohexyl acrylate=19° C.), tert-butyl methacrylate (Tg homo-tert-butyl methacrylate=118° C.), dodecyl methacrylate (Tf homo dodecyl methacrylate=−65° C.), 2-ethoxyethyl acrylate (Tg homo 2-ethoxyethyl acrylate=−50° C.), ethyl acrylate (Tg homo ethyl acrylate=−24° C.), hexyl acrylate (Tg hexyl acrylate=59° C.), styrene (Tg styrene homopolymer=100° C.).

It will also readily be understood that some of the pendant units arranged to provide a suitable affinity with the parts to be assembled can also serve to adjust the Tg or Tf of the "soft" polymer block.

Advantageously, the "soft" polymer block contains between 1 and 50%, preferably between 1 and 30% pendant units X, between 1 and 50%, preferably between 1 and 30% pendant units arranged to provide a suitable affinity with the parts to be assembled, and between 1 and 90%, preferably between 20 and 70% pendant units arranged to adjust the glass transition temperature Tg or the melting temperature Tf of the "soft" polymer block.

Techniques of block copolymerisation are well known to the person skilled in the art and do not need to be described in detail.

Two synthesis routes can preferably be used to obtain the block copolymer. A first possible route is the sequential synthesis of the blocks. This route can comprise the following steps, for example:

anionic styrene polymerisation to obtain the hard polymer block
  chain end functionalisation of the styrene to obtain a macroinitiator
  atom-transfer radical polymerisation (ATRP) of furfuryl methacrylate/butyl methacrylate/hydroxyethyl methacrylate to obtain a soft polymer block from the macroinitiator (=functional polystyrene)

or also:

controlled radical polymerisation of furfuryl methacrylate/butyl methacrylate/hydroxyethyl methacrylate from a bifunctional initiator
  growth of styrene blocks from the macroinitiator (=bifunctional soft block) by controlled radical polymerisation.

A second possible route is synthesis by "click chemistry" between the two hard and soft blocks. This route can comprise the following steps, for example:

synthesis by ATRP of an alkyne-functional copolymer of furfuryl methacrylate/hydroxyethyl methacrylate/butyl methacrylate
  click chemistry coupling of the alkyne-functional copolymer of furfuryl methacrylate/hydroxyethyl methacrylate/butyl methacrylate with the commercially available azide-functional polystyrene shown below:

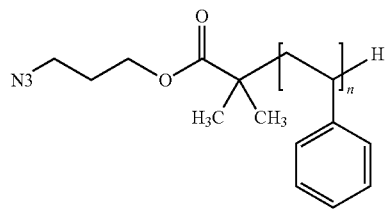

An example of block copolymer comprising a hard block and a soft block is shown below:

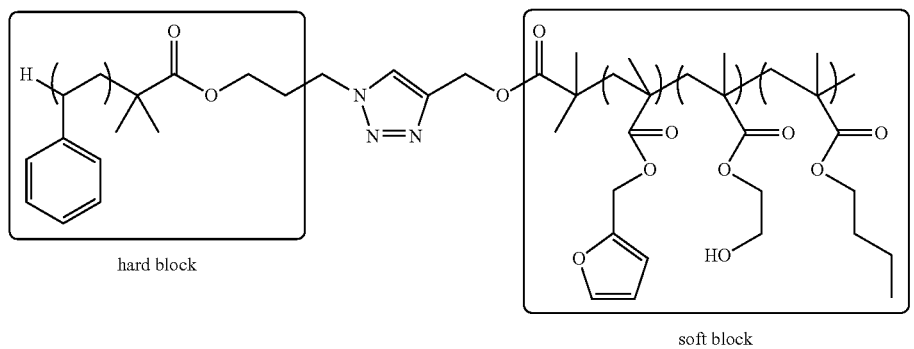

hard block soft block

As regards the coupling molecules, their dienophile groups Y are preferably derivatives of compounds selected from the group consisting of maleimide and maleic anhydride.

Y is preferably a derivative of maleimide.

Thus the coupling molecule can advantageously have a structure of formula (I) below:

where R1 is an alkyl chain, preferably a $(CH_2)_n$ chain with $1<n<35$ substituted or not by at least one hydroxy group or by an N-methyl maleimide group, an aryl chain, preferably a phenyl, or a PDMS (polydimethylsiloxane) chain or a structure of the form

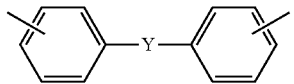

where Y=—O—, —S—, —CH$_2$—, —C(CH$_3$)$_2$— or a PDMS chain or a PEG (polyethylene glycol) chain.

Examples of particularly suitable coupling molecules that are commercially available are:

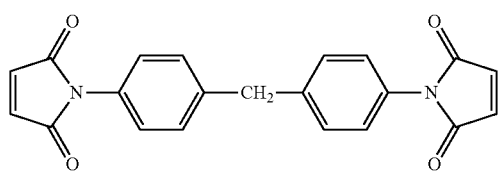

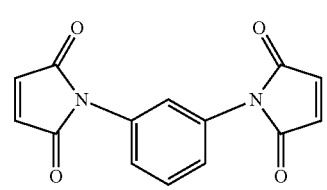

-continued

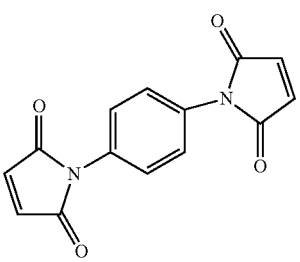

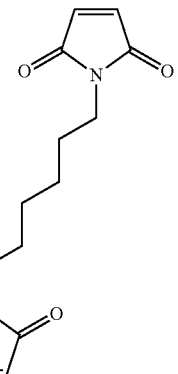

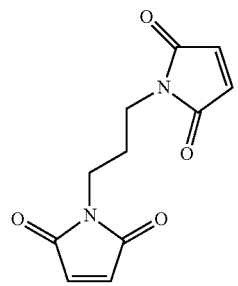

-continued

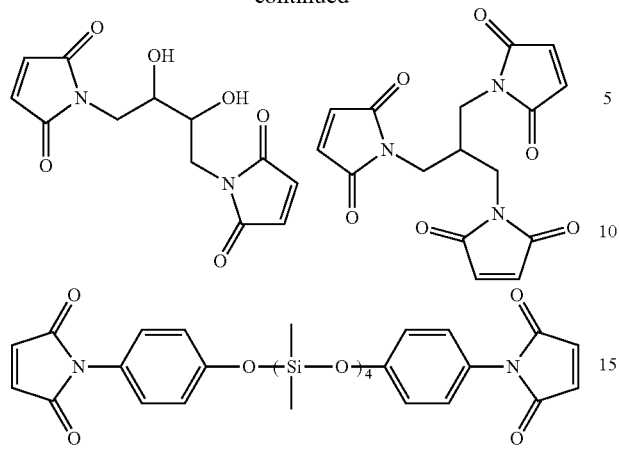

In the formulation provided in the form of a mixture of block copolymer chains comprising at least pendant diene units X and of coupling molecules comprising at least two dienophile end groups Y, the quantity of coupling molecules is such that the ratio of the number of coupling molecules to the number of pendant diene functions X ranges between 0.5:2 and 1.2:2 and preferably is equal to 1:2.

The two parts are assembled and can be repositioned using the assembly and repositioning process according to the invention, which comprises the steps of:
 a) preparing in a solvent (such as isopropyl alcohol, ethanol, methyl tert-butyl ether, tetrahydrofuran) a solution of an adhesive comprising at least one formulation having the form of a mixture of block copolymer chains comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than $T_{DA}$, and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$,
  where $T_A < T_{RDA} \leq T_C$, wherein temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$, and temperature $T_C$ is higher than the glass transition temperature Tg or the melting temperature Tf of the first polymer block,
 b) applying the solution of said adhesive to the parts to be assembled
 c) drying, e.g. in vacuum to eliminate the solvent
 d) placing the parts at a temperature higher than or equal to the glass transition temperature Tg or the melting temperature Tf of the first polymer block to finely reposition the parts
 e) cooling to a temperature lower than or equal to the glass transition temperature Tg or the melting temperature Tf of the first polymer block in order to immobilise the glued assembly of parts
 f) placing, e.g. by placing in an oven, for some hours the parts at a temperature higher than or equal to temperature $T_{DA}$ and lower than $T_{RDA}$ to link the block copolymer chains to one another by means of the coupling molecules by the Diels-Alder reaction so that the adhesive is in the form of a three-dimensional network
 g) if it is necessary to reposition the parts, heating said parts to temperature $T_C$ to regenerate the mixture of block copolymer chains and of coupling molecules by means of the retro-Diels-Alder reaction
 h) repositioning the parts
 i) duplicating steps e) to f)
 j) if necessary, repeating steps g) to i) as many times as required to reposition the parts again.

Thus, at ambient temperature in the normal conditions of use of the parts, the latter are glued by means of the adhesive that is resistant to chemical cleaning operations because of the three-dimensional network formed by the block copolymer chains. At higher temperature, i.e. at least at the temperature $T_{RDA}$ of the retro-Diels-Alder reaction, the bridges formed between the block copolymer chains by the coupling molecules break in order to break the three-dimensional network. The viscosity of the adhesive decreases such that it is then possible to meticulously reposition the parts. The assembly is cooled and placed at a temperature that allows to trigger the Diels-Alder reaction between the block copolymer chains and the coupling molecules in order to reform the three-dimensional network and immobilise the parts in their new position.

The advantage of a block structure is that the parts can be repositioned using heat and quickly immobilised by cooling the hard blocks while retaining the flexibility of the soft blocks so that they have sufficient mobility to be able to react by the Diels-Alder reaction with the coupling molecules at a temperature lower than the glass transition temperature of the melting temperature Tf of the hard blocks.

Example of synthesis of block copolymer chains:

The polymer chain is synthesised in the form of an A-B-A block copolymer using the following operating method:

furfuryl methacrylate (3 mL, 19.2 mmol), hydroxyethyl methacrylate (1.6 mL, 12.8 mmol), dodecyl methacrylate (5.6 mL, 19.2 mmol), catalyst Ru(Ind)Cl/PPh3)2 (10 mg), a solution of the bifunctional initiator CHCl2(COPh) (0.32 mL of a 400 mmol/L solution in toluene) and a solution of n-Bu3N in toluene (0.64 mL of a 0.27 mmol/L solution) are placed in a Schlenk flask containing toluene (6 mL) that has previously been degassed with nitrogen. The reaction medium is bubbled with nitrogen for 5 min, then agitated and heated to 80° C. for 24 h. The reaction medium is precipitated in acetone. The precipitate is separated by centrifuging, solubilised in toluene, then coagulated in methanol. The polymer is vacuum dried, then used as macroinitiator for the following step. For this, a solution of the macroinitiator polymer in toluene (2 mM) is prepared. Then, the 2M polymer macroinitiator solution (7.1 mL, 0.0142 mmol), catalyst Ru(Ind)Cl/PPh3)2 (10 mg) and methyl methacrylate (0.76 mL, 7.1 mmol) are placed into a Schenk flask. The mixture is heated and agitated for 24 h at 80° C. The reaction medium is precipitated in acetone. The precipitate is separated by centrifuging, solubilised in toluene, then coagulated in methanol. The polymer is vacuum dried, then used as macroinitiator for the following step.

The following block copolymer is obtained:

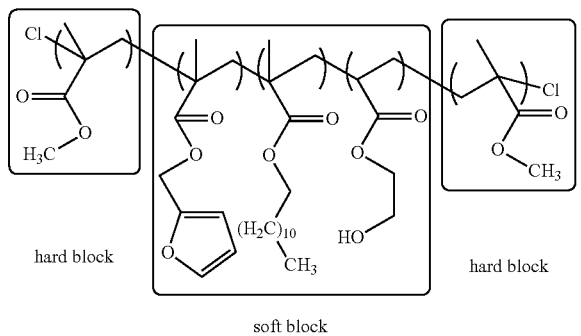

soft block

To form the repositionable hot melt adhesive the previously described block copolymer chain is placed in solution in toluene, then mixed with coupling agent 4,4'-(methylene di-p-phenylene)dimaleimide (134 mg, 0.375 mmol).

This solution is then deposited onto parts to be assembled according to the protocol described above.

What is claimed is:

1. A process for assembling and repositioning at least two timepiece parts through at least one hot melt adhesive, wherein said timepiece parts are held together in assembled position when said hot melt adhesive is at a temperature $T_A$ and can be repositioned in relation to one another when said hot melt adhesive is heated to a temperature $T_C$, comprising:
   a) preparing a solution comprising at least one hot melt adhesive comprising at least one formulation comprising a mixture of (i) at least one block copolymer comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than a temperature $T_{DA}$, and (ii) at least one coupling molecule comprising at least two dienophile end groups Y, wherein said units X and said groups Y are arranged to be able to react with one another and to bond together through a Diels-Alder reaction at a temperature $T_{DA}$ and to be able to obtain the mixture of block copolymer and of coupling molecules through a retro-Diels-Alder reaction at a temperature $T_{RDA}$,
   wherein $T_A<T_{RDA}\leq T_C$, temperature $T_{DA}$ ranges between 0° C. and 100° C., temperature $T_{RDA}$ ranges between 50° C. and 200° C., $T_{DA}$ is lower than $T_{RDA}$, and temperature $T_C$ is higher than the glass transition temperature Tg or the melting temperature Tf of the first polymer block,
   b) applying the solution of said hot melt adhesive to the timepiece parts to be assembled,
   c) drying the solution,
   d) placing the timepiece parts at a temperature higher than or equal to the glass transition temperature Tg or the melting temperature Tf of the first polymer block and repositioning the timepiece parts,
   e) cooling the timepiece parts to a temperature lower than or equal to the glass transition temperature Tg or the melting temperature Tf of the first polymer block,
   f) placing the timepiece parts at a temperature higher than or equal to temperature $T_{DA}$ and lower than $T_{RDA}$ to link the block copolymer through the coupling molecules through a Diels-Alder reaction so that the hot melt adhesive is in the form of a three-dimensional network,
   g) heating said timepiece parts to temperature $T_C$ to obtain the mixture of block copolymer and of coupling molecules through a retro-Diels-Alder reaction,
   h) repositioning the timepiece parts,
   i) repeating e) and f), and
   j) optionally, repeating g) to i) one or more times to reposition the timepiece parts.

2. The process according to claim 1, wherein temperature $T_{DA}$ ranges between 25° C. and 70° C.

3. The process according to claim 1, wherein temperature $T_{RDA}$ ranges between 80° C. and 150° C.

4. The process according to claim 1, wherein the first polymer block has a glass transition temperature Tg or a melting temperature Tf ranging between 60° C. and 150° C.

5. The process according to claim 1, wherein the second polymer block has a glass transition temperature Tg or a melting temperature Tf ranging between −50° C. and 60° C.

6. The process according to claim 1, wherein the block copolymer comprises at each of its ends a first polymer block having a glass transition temperature Tg or a melting temperature Tf ranging between 40° C. and 200° C., and a central second polymer block comprising at least pendant diene units X and having a glass transition temperature Tg or a melting temperature Tf lower than $T_{DA}$.

7. The process according to claim 6, wherein the first polymer block which is at each end of the block copolymer has a glass transition temperature Tg or a melting temperature Tf ranging between 60° C. and 150° C.

8. The process according to claim 6, wherein the central second polymer block has a glass transition temperature Tg or a melting temperature Tf ranging between −50° C. and 60° C.

9. The process according to claim 1, wherein the first polymer block having a glass transition temperature Tg or a melting temperature Tf ranging between 40° C. and 200° C. is selected from the group consisting of poly(tert-butyl methacrylate), poly(4-tert-butyl styrene), poly(cyclohexyl methacrylate), polystyrene, poly(methyl methacrylate), and mixtures thereof.

10. The process according to claim 1, wherein the second polymer block comprises pendant units arranged to have affinity with the timepiece parts to be assembled.

11. The process according to claim 1, wherein the second polymer block comprises pendant units arranged to adjust the glass transition temperature Tg or melting temperature Tf of said second polymer block.

12. The process according to claim 1, wherein the pendant diene units X are selected from the group consisting of furan, cyclopentadiene, anthracene, and mixtures thereof.

13. The process according to claim 10, wherein the pendant units arranged to have affinity with the timepiece parts to be assembled are selected from the group consisting of thiols, thioethers, thioesters, sulphides, thioamides, hydroxyls, catechol, amines, ammoniums, nitrogenated heterocycles, carboxylic acids, esters, anhydrides, and mixtures thereof.

14. The process according to claim 11, wherein the pendant units arranged to adjust the glass transition temperature Tg or melting temperature Tf of the second polymer block are selected from the group consisting of alkyl chains, functionalised alkyl chains, phenyl derivatives, and mixtures thereof.

15. The process according to claim 1, wherein the dienophile groups Y are derivatives of compounds selected from the group consisting of maleimide, maleic anhydride, and mixtures thereof.

16. The process according to claim 12, wherein the first polymer block having a glass transition temperature Tg or a melting temperature Tf ranging between 40° C. and 200° C. is selected from the group consisting of poly(tert-butyl methacrylate), poly(4-tert-butyl styrene), poly(cyclohexyl methacrylate), polystyrene, poly(methyl methacrylate), and mixtures thereof.

17. The process according to claim 13, wherein the first polymer block having a glass transition temperature Tg or a melting temperature Tf ranging between 40° C. and 200° C. is selected from the group consisting of poly(tert-butyl methacrylate), poly(4-tert-butyl styrene), poly(cyclohexyl methacrylate), polystyrene, poly(methyl methacrylate), and mixtures thereof.

18. The process according to claim 14, wherein the first polymer block having a glass transition temperature Tg or a melting temperature Tf ranging between 40° C. and 200° C. is selected from the group consisting of poly(tert-butyl methacrylate), poly(4-tert-butyl styrene), poly(cyclohexyl methacrylate), polystyrene, poly(methyl methacrylate), and mixtures thereof.

19. The process according to claim 15, wherein the first polymer block having a glass transition temperature Tg or a melting temperature Tf ranging between 40° C. and 200° C. is selected from the group consisting of poly(tert-butyl methacrylate), poly(4-tert-butyl styrene), poly(cyclohexyl methacrylate), polystyrene, poly(methyl methacrylate), and mixtures thereof.

* * * * *